United States Patent
Singh

(10) Patent No.: US 10,867,181 B2
(45) Date of Patent: Dec. 15, 2020

(54) DYNAMICALLY PRESENTING AUGMENTED REALITY INFORMATION FOR REDUCING PEAK COGNITIVE DEMAND

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/480,068

(22) PCT Filed: Feb. 13, 2018

(86) PCT No.: PCT/US2018/018006
§ 371 (c)(1),
(2) Date: Jul. 23, 2019

(87) PCT Pub. No.: WO2018/152109
PCT Pub. Date: Aug. 23, 2018

(65) Prior Publication Data
US 2019/0370548 A1    Dec. 5, 2019

Related U.S. Application Data

(60) Provisional application No. 62/461,034, filed on Feb. 20, 2017.

(51) Int. Cl.
*G06T 11/00* (2006.01)
*G06K 9/00* (2006.01)
(Continued)

(52) U.S. Cl.
CPC .......... *G06K 9/00671* (2013.01); *G06F 3/011* (2013.01); *G06T 11/60* (2013.01); *G06T 19/006* (2013.01)

(58) Field of Classification Search
None
See application file for complete search history.

(56) References Cited

U.S. PATENT DOCUMENTS 9,607,436 B2 *   3/2017   Malamud .............. G06F 16/355
9,690,457 B2 *   6/2017   Levien .................... G06T 11/00
(Continued)

FOREIGN PATENT DOCUMENTS

GB        2513865 A       11/2014
WO    2015081313 A9       6/2015

OTHER PUBLICATIONS

Microsoft, For Statement (C++). Microsoft web link, available at: https://docs.microsoft.com/en-us/cpp/cpp/for-statement-cpp?view=vs-2019, Nov. 3, 2016 4 pages.
(Continued)

*Primary Examiner* — Martin Mushambo
(74) *Attorney, Agent, or Firm* — Invention Mine LLC

(57) ABSTRACT

Systems and methods are described for temporally distributing the display of augmented reality (AR) information to reduce cognitive load on a user. In an exemplary embodiment, each item of AR information is associated with a respective real-world object. A cognitive demand score is determined for each item together with its associated real-world object. AR information items are distributed among a plurality of sets in such a way that (i) the total cognitive demand scores in the respective sets are substantially equalized and (ii) AR information items within a set do not obscure one another. Each set of AR information items is then displayed sequentially, with the items in different sets being displayed at different times.

22 Claims, 7 Drawing Sheets

(51) Int. Cl.
　　　*G06F 3/01*　　　(2006.01)
　　　*G06T 11/60*　　(2006.01)
　　　*G06T 19/00*　　(2011.01)

(56) References Cited

U.S. PATENT DOCUMENTS

| | | | | |
|---|---|---|---|---|
| 9,712,574 | B2* | 7/2017 | Bosworth | G06Q 50/01 |
| 9,864,909 | B2* | 1/2018 | Bare | G06T 19/006 |
| 2012/0019557 | A1 | 1/2012 | Aronsson | |
| 2012/0075341 | A1 | 3/2012 | Sandberg | |
| 2012/0075433 | A1 | 3/2012 | Tatzgern | |
| 2012/0098859 | A1* | 4/2012 | Lee | G06K 9/00671 |
| | | | | 345/633 |
| 2013/0342574 | A1* | 12/2013 | Tseng | G06F 16/29 |
| | | | | 345/633 |
| 2014/0168262 | A1 | 6/2014 | Forutanpour | |
| 2014/0184496 | A1 | 7/2014 | Gribetz | |
| 2014/0204119 | A1 | 7/2014 | Malamud | |
| 2015/0054726 | A1 | 2/2015 | Brancato | |
| 2015/0078667 | A1 | 3/2015 | Yun | |
| 2015/0262428 | A1 | 9/2015 | Tatzgern | |
| 2016/0170998 | A1 | 6/2016 | Frank | |
| 2016/0240011 | A1 | 8/2016 | Fedosov | |
| 2017/0053186 | A1* | 2/2017 | Allen | G06K 9/00302 |
| 2017/0127132 | A1* | 5/2017 | Shekhar | H04N 21/4126 |
| 2018/0310870 | A1* | 11/2018 | Givon | A61B 5/4088 |
| 2018/0357803 | A1* | 12/2018 | Zhang | G06T 3/0012 |
| 2019/0073547 | A1* | 3/2019 | el Kaliouby | G08G 1/0129 |
| 2019/0147347 | A1* | 5/2019 | Ng | G06F 8/20 |
| | | | | 706/46 |
| 2019/0147348 | A1* | 5/2019 | Ng | G06N 3/006 |
| | | | | 706/46 |
| 2019/0147349 | A1* | 5/2019 | Ng | G06N 20/00 |
| | | | | 706/12 |
| 2019/0160382 | A1* | 5/2019 | Miyaki | A63F 13/212 |
| 2019/0188281 | A1* | 6/2019 | Bivens | G06F 16/156 |
| 2019/0268660 | A1* | 8/2019 | el Kaliouby | G06K 9/00845 |

OTHER PUBLICATIONS

Moderenes, "Sleep and Wait". Moderenes web link, available at: https://www.modernescpp.com/index.php/sleep-and-wait, Sep. 26, 2016, 7 pages.

International Search Report and Written Opinion of the International Searching Authority for PCT/US2018/018006 dated May 17, 2018.
Julier S. et al, "Information Filtering for Mobile Augmented Reality". Proceedings IEEE and ACM International Symposium on Augmented Reality, (ISAR 2000), Oct. 5-6, 2000, pp. 3-11.
Wikipedia, "Jaccard Index". Wikipedia web article, available at: https://en.wikipedia.org/w/index.php?title=Jaccard_index&oldid=766170736, modified on Feb. 17, 2017.
Korf, R., "Multi-Way Number Partitioning". Proceedings of International Joint Conferences on Artificial Intelligence (IJCAI), available at, http://ijcai.org/Proceedings/09/Papers/096.pdf, (2009), pp. 538-543.
Bell, B., et. al., "View Management for Virtual and Augmented Reality". ACM Symposium on User Interface Software and Technology (UIST 2001), Nov. 11-14, 2001, pp. 101-110.
Wikipedia, "Jaccard Index". Wikipedia web article modified on Dec. 13, 2016, available at: https://en.wikipedia.org/w/index.php?title=Jaccard_index&oldid=754661103, 6 pages.
Experimedia Project, "Pinpoint Schladming: Geospatial Augmented Reality on Mobile Devices". YouTube link available at: https://www.youtube.com/watch?v=bo1TFR_QpaE&ab_channel=ExperimediaProject, published on Nov. 12, 2013.
Layar, "Geo Layer". Web Archive dated Sep. 12, 2015, available at: http://web.archive.org/web/20150912040730/https://www.layar.com/documentation/browser/howtos/geolocation-layer/, 3 pages.
CNET, "Meta Glasses Are the Future of Computing". YouTube Link available at: https://www.youtube.com/watch?v=b717JuQXttw&ab_channel=CNET, published on Aug. 9, 2013.
International Preliminary Report on Patentability for PCT/US2017/066472 completed on Dec. 11, 2018, 14 pages.
International Search Report and Written Opinion of the International Searching Authority for PCT/US2017/066472 dated Mar. 19, 2018.
Jankowski, J. et. al., "On the Design of a Dual-Mode User Interface for Accessing 3D Content on The World Wide Web". International Journal of Human-Computer Studies, vol. 71, No. 7, May 8, 2013, pp. 838-857.
Julier, S., et. al., "Information Filtering for Mobile Augmented Reality". Proceedings of International Symposium on Augmented Reality (ISAR), Oct. 5, 2000, pp. 3-11.
International Preliminary Report on Patentability for PCT/US2018/018006 dated Aug. 20, 2019, 8 pages.

\* cited by examiner

AR DISPLAY VIEW WITHOUT SYSTEMS AND METHODS DISCLOSED WITHIN:

AR DISPLAY VIEWS WITH SYSTEMS AND METHODS DISCLOSED WITHIN:

DYNAMICALLY PRESENTING AUGMENTED REALITY INFORMATION FOR REDUCING PEAK COGNITIVE DEMAND

CROSS-REFERENCE TO RELATED APPLICATIONS

The present application is a national stage application under 35 U.S.C. 371 of International Application No. PCT/US2018/018006, entitled DYNAMICALLY PRESENTING AUGMENTED REALITY INFORMATION FOR REDUCING PEAK COGNITIVE DEMAND, filed on Feb. 13, 2018, which claims benefit under 35 U.S.C. § 119(e) from U.S. Provisional Patent Application Ser. No. 62/461,034, entitled SYSTEM AND METHOD FOR DYNAMICALLY PRESENTING AUGMENTED REALITY INFORMATION FOR REDUCING PEAK COGNITIVE DEMAND PLACED ON A USER, filed Feb. 20, 2017, the disclosure of which is hereby incorporated by reference.

BACKGROUND

Augmented Reality (AR) operating systems that support multiple applications may overload a user with too much information or may cause a user to suffer from attention overload. An AR user interface determines what AR information items to display to the user.

One issue to be addressed in the implementation of practical AR systems is a determination of what AR information is to be displayed and when it should be displayed. If too much information is displayed at once, the burden on a user may be too great. The display of excessive amounts of information may cause stress and burnout for a user and may lead to a user making mistakes, shutting down applications, or unsubscribing from applications. If too little information is displayed, the process becomes inefficient, and the user may become bored or annoyed, leading to a user shutting down of unsubscribing from applications.

SUMMARY

Systems and methods described herein are provided for temporally distributing the display of augmented reality (AR) information in a manner that manages the cognitive demand placed on a user. In an exemplary embodiment, each item of AR information is associated with a respective real-world object. A cognitive demand score is determined for each item together with its associated real-world object. AR information items are distributed among a plurality of sets in such a way that (i) the total cognitive demand scores in the respective sets are substantially equalized and (ii) AR information items within a set do not obscure one another. Each set of AR information items is then displayed sequentially, with items in the same set being displayed at the same time and items in different sets being displayed at different times.

In some embodiments, systems and methods described herein compute a cognitive demand score for each pair of real-world object identification information and an AR information item based on visual characteristics of the real-world object and complexity and size of the AR information item (such as number of words or characters). Systems and methods described herein partition received pairs into two or more sets, such that the resulting sets of pairs are of approximately equal aggregate cognitive demand on a user. These sets are presented to the user one set of pairs at a time. AR information is presented to the user in a manner that reduces the peak aggregate cognitive demand on the user.

The density of information for content presentation may be high and unevenly distributed over a display area. Previous systems do not determine implications that may arise in presenting AR content. Systems and methods described herein manage presentation of AR information on a display device based on cognitive load of the content and deal with complications due to content being tied to physical objects in a scene and the potential for content to obscure other content elements.

In some embodiments, exemplary systems and methods described here are passive and continue to execute, even if the user is not taking the initiative. The user may gradually become more familiar with his or her surroundings in a casual, intuitive manner. In some embodiments, systems and methods detect changes to a user's scene and respond appropriately. Systems and methods may be instantiated on top of existing AR applications and displays and may be combined with other techniques, such as receiving prioritized information from AR applications and taking into account a users preferences across available AR information.

BRIEF DESCRIPTION OF THE DRAWINGS

A more detailed understanding may be had from the following description, presented by way of example in conjunction with the accompanying drawings. Furthermore, like reference numerals in the figures indicate like elements.

Figure 1:
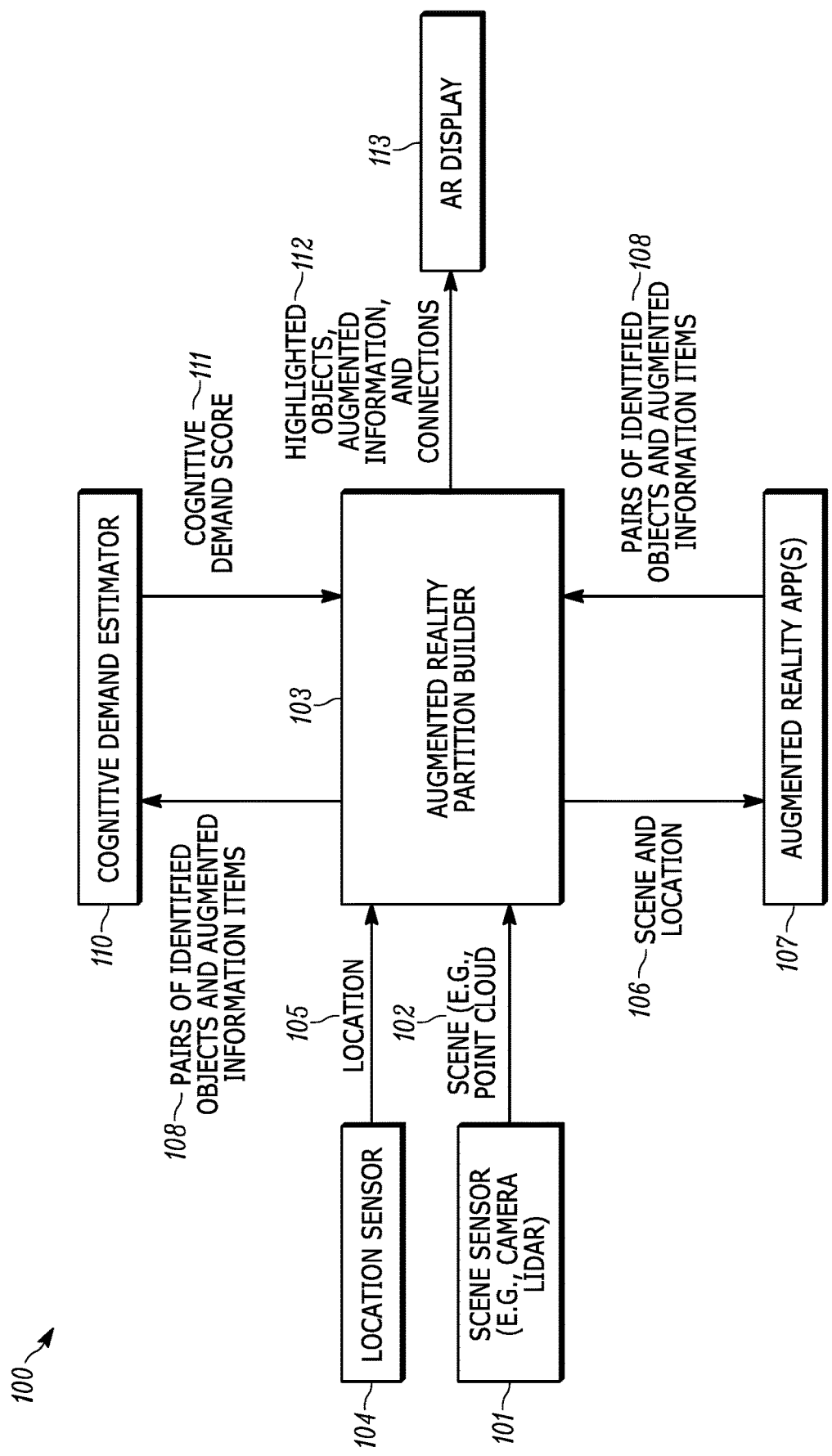
FIG. 1 is a block diagram of an embodiment of systems described herein.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least one embodiment, . . . " For brevity and clarity of presentation, this implied leading clause is not repeated ad nauseum in the detailed description of the drawings.

DETAILED DESCRIPTION

One technique for selecting AR information to be displayed to a user is to display AR information about real-world objects that are in a users field of view, including objects that may be too far away to be discerned by the user. Such a technique, however, may overwhelm a user with AR information, such as environments with many real-world objects in the user's field of view in which information is available for presentation to the user. Such information may become less and less relevant to the user.

Another technique for selecting AR information to be displayed to a user is to display AR information only for real-world objects on which a users gaze rests. Such a technique, however, would not operate to communicate unanticipated or unknown information to the user, and it calls for the user to actively select objects (by directing her gaze) about which information is to be displayed. Moreover, such a technique would not readily accommodate simultaneous display of information on multiple different objects.

Systems and methods described herein present augmented reality (AR) information in a manner that reduces the aggregate cognitive demand placed upon the user from having to process concurrently-presented AR information items. One embodiment partitions available items into two or more sets to approximately balance aggregate cognitive demand placed on a user. These sets may be presented serially, such that all AR items in one set are presented, followed by all AR items in another set, and so on. Peak cognitive demand (maximum demand for all of these sets) placed on a user is minimized.

Available AR items are partitioned into two or more sets to approximately balance aggregate cognitive demand on the user, so that peak aggregate cognitive aggregate cognitive demand is reduced. A cognitive load is how much mental effort a user exerts. Cognitive demand of an information item is how much mental effort a user exerts to process that information item, such as to view, reason (or analyze), and act upon.

For some embodiments, cognitive demand of each object (e.g., its complexity) is determined, and sets are partitioned such that the sets are (approximately) balanced in terms of combined cognitive demands and also such that each set avoids conflicts between objects. For such an embodiment, AR information is displayed one set at a time.

FIG. 1 is a block diagram of an exemplary embodiment of an AR system 100. In system 100, one or more scene sensors 101 (for example, a camera or LIDAR) provides scene information 102 (e.g., as a point cloud) to an AR Partition Builder 103. One or more location sensors 104 provide location information 105, providing the user's location to AR Partition Builder 103. AR Partition Builder 103. receives scene information 102 and location information 105 from respective sensors and sends combined scene and location information 106 to one or more appropriate (e.g., subscribed) AR applications (AR Apps) 107. AR Apps 107 uses the received information 106 to produce a set of pairs 108 of identified real-world objects and corresponding augmentation information (AR data). Each pair, in set of pairs 108 includes information identifying a real-world object (possibly using an identification by location coordinates that includes an image of the object and boundary coordinates) along with associated AR data that provides information about the real-world object and may also describe how to render that information in an AR display. AR Apps 107 then provides set of pairs 108 to AR Partition Builder 103.

AR Partition Builder 103 sends set of pairs 108 to the Cognitive Demand Estimator 110. Cognitive Demand Estimator 110 calculates a cognitive demand score 111 that each pair may place on a user, based on the size and complexity of an image of the real-world object in the pair and the amount and complexity of information in the AR information item in the pair. Cognitive Demand Estimator 110 sends cognitive demand score 111 to AR Partition Builder 103 for each pair in set of pairs 108. Based on the received cognitive demand scores and scene characteristics (to determine occlusion), an AR Partition Builder 103 partitions set of pairs 108 into two or more sets. AR Partition Builder 103 sends the sets of pairs as highlighted objects and AR information 112 to the AR Display 113, to be displayed one at a time. If a location or scene changes significantly based on received information, AR Partition Builder 103 may request revised cognitive demand scores from Cognitive Demand Estimator 110 and form a revised partition of the set of pairs 108.

Figure 2:
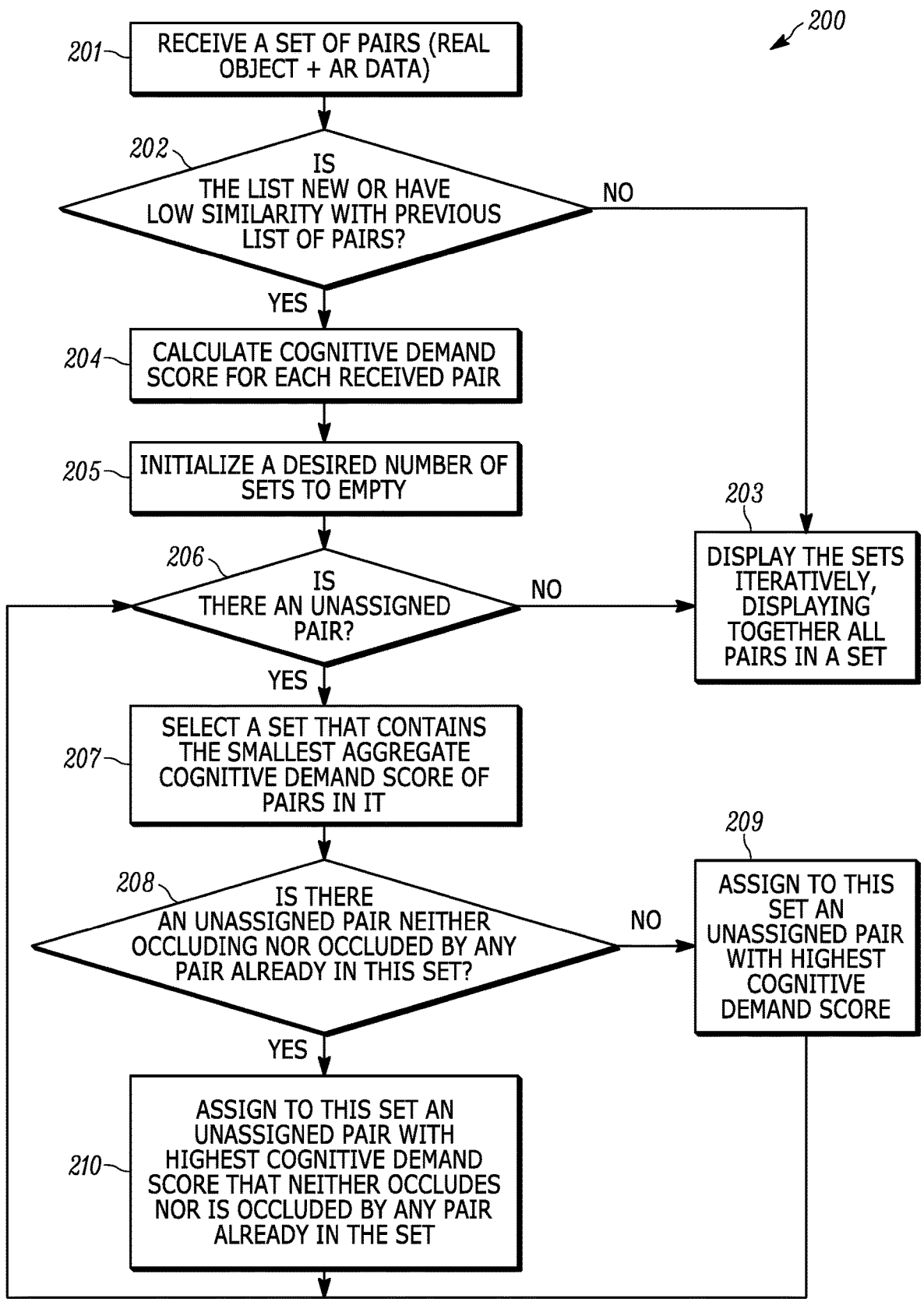
FIG. 2 is a flowchart of an exemplary method of assigning pairs (real-world object identification information and associated AR information) to a set.

FIG. 2 is a flowchart of an exemplary method 200 of assigning pairs (real-world object image information and associated AR information) to a set. In some embodiments, each pair of information received comprises one real-world object identified by the object's geospatial coordinates and the object's image and associated AR information item that may specify and render some associated augmented information, including the name and other attributes of the real-world object. Method 200 is one way to assign pairs (with associated real-world objects) into two or more sets for a system that displays one set at a time. An exemplary method may comprise receiving pairs of information, assigning sets that balance aggregate cognitive demand, and displaying sets repeatedly one at a time. For some embodiments, AR information items may be assigned to sets, which may be performed for some embodiments by assigning pairs to sets.

In box 201 of method 200, a set of pairs of information is received, for example, possibly set of pairs 108 which was illustrated in FIG. 1. These pairings include identification of a real-world object plus corresponding AR information (Real Object+AR data). In decision box 202, it is determined whether the received set is new or has a low level of similarity with a previous set of pairs (or has significant changes from a previous time a set was assigned). If not, method 200 proceeds to box 203 in which the sets are displayed iteratively. As each set is displayed, all pairs in the set are displayed simultaneously.

If the set of pairs is new, or there has been significant change, as determined in decision box 204, cognitive demand scores are calculated for each received pair in box 204. For some embodiments, a cognitive demand score for a pair is calculated based on the cognitive demand placed on a user for both the real-world object and the AR information item. The cognitive demand score may be calculated based on the complexity or size of the real-world object, because a user may consume mental energy if his or her attention is drawn to the real-world object (which may occur due to AR information being present). The user may consume mental energy if he or she reviews the AR information.

For some embodiments, a raw score is determined by multiplying a real-world object sub-score by an AR information item sub-score. A cognitive demand score is determined by normalizing the highest raw score to 100 and scaling all the other raw scores by the same ratio as the highest raw score. For some embodiments, a real-world object sub-score is determined by summing a size value and a complexity value. A size value may be determined based on the angle subtended. A subtended angle is measured by extending two straight lines from a user's view point to the farthest opposing points on the boundary of a real-world object and maximizing the angle made by the two straight lines. For some embodiments, a size value of 100 is used if the subtended angle is less than 0.5 degrees. A size value of 80 is used if the subtended angle is between 0.5 and 2 degrees. A size value of 60 is used if the subtended angle is between 2 and 5 degrees. A size value of 50 is used if the subtended angle is more than 5 degrees. A complexity value may be determined based on the complexity of the image of the real-world object as determined by an object's compressed size (which may be expressed in mega-bytes (MB) or other units).

For some embodiments, an AR information item sub-score is determined by summing the complexity of any text in the AR information item, the complexity of any images in the AR information item, and the complexity of any video in the AR information item. The complexity of any text in the AR information item may be calculated as the sum of the number of words in the text and the sum of the lengths of the three longest words (or the sum of the length of all the words if there are less than three words in the text). The complexity of any images in the AR information item may be calculated as the sum of the complexity of each image, which in turn may be calculated as the image's compressed size (which may be in MB). The complexity of any video in the AR information item may be calculated as the sum of ten times the length of the video in seconds plus the complexity of the most complex frame in the video, which may be calculated as the video's compressed size (which may be in MB). Some embodiments may use another method instead of image compression size to calculate image complexity.

Each entry in a set of pairs is a pairing of information identifying a real-world object (which may be specified by coordinates) and an AR information item (which is information about the real-world object). For some embodiments, to determine if a set of pairs has changed significantly, each entry in the previous set of pairs is compared to the current set. A Jaccard Index is calculated, and the set is classified as significantly changing if the Jaccard Index is below a threshold (e.g. 0.8). To compare each entry in the previous set of pairs to the current set, let each pair in the previous set have coordinates $<x_p, y_p, z_p>$, and let each pair in the current set have coordinates $<x_c, y_c, z_c>$. Record two pairs as being the same if a squared distance calculation is less than a squared distance threshold (e.g., 0.5 meters$^2$), and the AR information of the two pairs are identical (or similar). The squared distance calculation is calculated as:

$$\text{Squared Distance} = (x_c - x_p)^2 + (y_c - y_p)^2 + (z_c - z_p)^2 \qquad \text{Eq. 1}$$

For some embodiments, the squared distance is used to match entries between the previous and the current sets of pairs and determine which entries have changed. A Jaccard Index may be calculated to determine the similarity between the sets.

Use of a threshold may enable two pairs to be classified as identical if there is a small variation in the measurement of coordinates (such as due to measurement error or slight movements of a users head and body). If AR information (or metadata) changes, that may mean that a new real-world object has moved into the position previously occupied by another object or that an AR application has changed AR information about the same real-world object. If either AR information change occurs, the change may be of value to the user.

In box 205, a desired number of empty sets is created and initialized to an empty state. The existence of an unassigned pair (i.e., a pair that is not already assigned to a set) is ascertained in decision box 206. Initially, this will be the case for all pairs. When all pairs have been assigned, and this condition is no longer true, method 200 will proceed to box 203. However, until such a condition is satisfied, method 200 will instead proceed to box 207.

If there exists an unassigned pair, a current set is iteratively selected as by selecting a set that has the smallest aggregate (or summed) cognitive demand score of pairs assigned to the set, in box 207. If there is an unassigned pair that neither is occluding nor occluded by any pair already assigned to the current set, as determined in decision box 208, then an unassigned pair with the highest cognitive demand score that neither occludes nor is occluded by any pair already assigned to the current set is selected and assigned to the current set in box 210. Otherwise, an unassigned pair with the highest cognitive demand score is assigned to the current set in box 209. After either box 209 or 210, method 200 returns to decision box 206.

For some embodiments, ties in aggregate demand score are broken arbitrarily. For some embodiments, assignment of sets to pairs is stopped if a maximum number of pairs to display is exceeded (or is equal to an assigned AR information item threshold). For some embodiments, if a first pair is occluded by some previously assigned pair in each set, the first pair is assigned to the set where the first pair has the least amount of occlusion from any previously assigned pair. For some embodiments, the order for handling unassigned pairs alternates between using the top pair on one of two sets, where one set is sorted with decreasing demand scores and a second set is sorted with increasing demand scores, until each pair is assigned to a set. For such embodiments, sets of objects may be more closely balanced in terms of demand scores than assigning pairs only in decreasing order of demand score.

For some embodiments, pairs are assigned to sets so that each set has a substantially equal total of demand scores for pairs assigned to a set. For other embodiments, pairs are assigned to sets to minimize the difference in total demand scores for pairs assigned to a set. See Richard Korf, *Multi-Way Number Partitioning*, 21 ARTIFICIAL INTELLIGENCE JOURNAL 538-543 (2009), available at ijcai.org/Proceedings/09/Papers/096.pdf. For some embodiments, salience values are calculated for the pairs assigned to a set and sets are displayed in order of decreasing aggregate salience. For some embodiments, sets are displayed for a duration corresponding to aggregate salience (e.g., displaying sets for a duration proportional to aggregate salience with minimum and maximum limits for display time).

For some scenarios, there may be more AR information items that occlude each other than may be placed in available sets. For example, suppose there are four overlapping pairs (A, B, C, D) and three sets (S1, S2, and S3) are to be created. For this example, the pairs are in decreasing order of cognitive demand such that A>B>C>D. Three sets are initialized, and the highest demand pair, A, is assigned to set S1. The second highest demand pair, B, is assigned to set S2, and the third highest demand pair, C, is assigned to set S3. Set S3 is selected as the current set because set S3 has the smallest aggregate cognitive demand. Pair D is the only unassigned pair left, and pair D occludes (or overlaps) a pair already assigned to sets S1, S2, and S3 (pairs A, B, and C, respectively). Hence, pair D is assigned to set S3. Sets S1, S2, and S3 are displayed one at a time.

For some embodiments, each pair is assigned to a set, and if too many occluding pairs exist, some pairs may occlude other pairs assigned to one or more sets. Therefore, in such a scenario, there may be two or more occluding pairs assigned to the same set, leading to a reduced user experience. For some embodiments, if there are more occluding pairs than sets (such as was shown in the above example), the number of available sets may be expanded. A set is assigned only pairs that neither occlude nor are occluded by pairs present in the set. If a pair occludes or is occluded by a pair assigned to each set, the number of sets is increased, each set is initialized to empty, and the method repeats the process of assigning pairs to sets. Such an embodiment produces sets where no pair occludes or is occluded by another pair in a set, and the aggregate cognitive demand is lowered. Method 200 may be cycled, so that it repeats when a new set of pairs is received in box 201.

Figure 3:
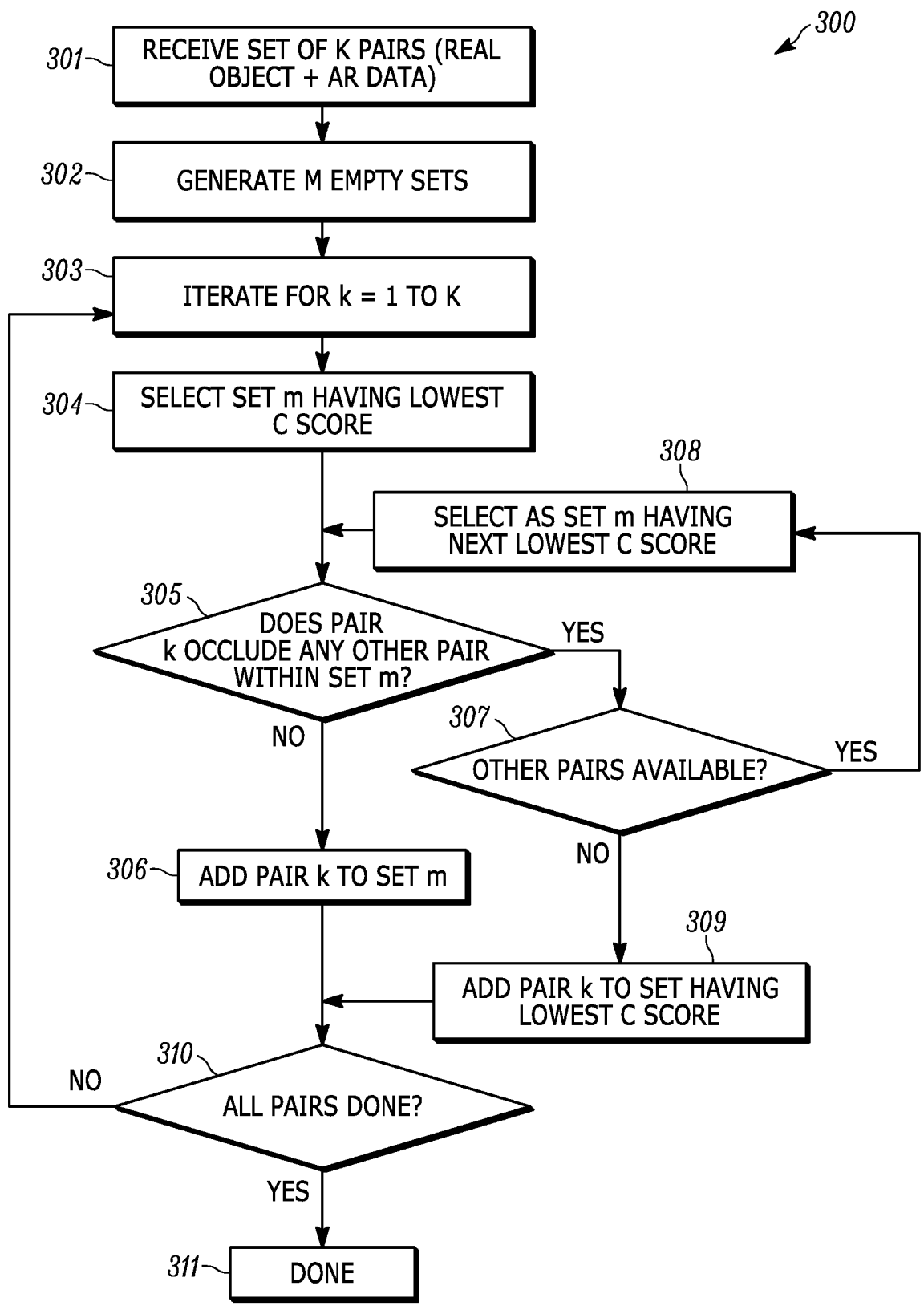
FIG. 3 is a flowchart of another exemplary method of assigning pairs to a set.

FIG. 3 is another flowchart of an embodiment of assigning pairs (real-world object identification information and associated AR information) to a set. In FIG. 3, a method 300 begins in box 301 with the reception of a set of K pairs of Real Object+AR data. M empty sets are generated in box 302, and the following procedure is iterated for all K pairs, as indicated by box 303. Box 303 may, for example, begin with the pair having the highest C score and work in descending order. The set m, out of the M sets, which has the lowest cognitive demand score (C score) is selected in box 304. In decision box 305, the current pair, denoted as pair k, is checked for occlusion with other pairs already assigned to set m. If there is no occlusion, then current pair k is added to set m, in box 306. If there is occlusion, as determined in decision box 305, method 300 proceeds to decision box 307, to ascertain whether there are remaining sets in the collection of M sets. If there are, then method 300 selects the set having the next lowest C score, and sets this as set m in box 308, before returning to decision box 305 with the new set designated as m. If, in decision box 309, there is no set without occlusion, then pair k is added to the set having the lowest C score in box 309. Box 309 may alternatively implement different assignment methods, as described above, such as assigning pair k based on having the lowest amount of occlusion.

After box 306 or 309, method 300 proceeds to decision box 310 to ascertain whether all pairs have been assigned to a set. If not, method 300 returns to box 303, to assign the next pair. Once all pairs have been assigned, method 300 completes in box 311.

An example assignment will now be described, referenced to method 300 in FIG. 3. In this example, there are nine pairs of real-world objects and AR information items received in box 301. In decreasing order, their cognitive demand scores are 100, 95, 78, 42, 37, 28, 26, 19, and 8. Three sets (A, B, and C) are generated in box 302, and the pairs are handled in decreasing order of their scores. Sets A, B, and C are initially empty, so each set has an aggregate demand score of 0. The highest scoring unassigned pair (with a score of 100) is selected as the initial pair to place in box 303 (descending order iteration). Set A is identified as having the lowest aggregate score of 0 in box 304. Set A is tied with sets B and C, so any of the sets could have been chosen on this first iteration.

Since set A is otherwise empty, there is no occlusion, as determined in decision box 305, so the pair is added to set A in box 306. The sets have the following assignments at this point:
  Set A: {100}, Aggregate Score=100
  Set B: { }, Aggregate Score=0
  Set C: { }, Aggregate Score=0
Only one of the nine sets has been assigned, so after decision box 310, the next highest scoring unassigned pair with a score of 95 is considered next in box 303. In box 304, set B is identified as having the lowest aggregate score of 0 (tied with set C). Since set B is otherwise empty, there is no occlusion, as determined in decision box 305, so the pair is added to set B in box 306. The sets have the following assignments at this point:
  Set A: {100}, Aggregate Score=100
  Set B: {95}, Aggregate Score=95
  Set C: { }, Aggregate Score=0
Only two of the nine sets have been assigned, so after decision box 310, the next highest scoring unassigned pair with a score of 78 is considered next in box 303. In box 304, set C is identified as having the lowest aggregate score of 0. Since set C is otherwise empty, there is no occlusion, as determined in decision box 305, so the pair is added to set C in box 306. The sets have the following assignments at this point:
  Set A: {100}, Aggregate Score=100
  Set B: {95}, Aggregate Score=95
  Set C: {78}, Aggregate Score=78
Only three of the nine sets have been assigned, so after decision box 310, the next highest scoring unassigned pair with a score of 42 is considered next in box 303. In box 304, set C is identified as having the lowest aggregate score of 78. However, in this example, decision box 305 ascertains there will be occlusion. In decision box 307, it is determined that sets A and B are both available, so set B is identified as having the next lowest aggregate score of 95 in box 308. There is no occlusion by adding pair 42 to set B as determined in decision box 305, so pair 42 is assigned to set B in box 306. The sets have the following assignments at this point:
  Set A: {100}, Aggregate Score=100
  Set B: {95, 42}, Aggregate Score=137
  Set C: {78}, Aggregate Score=78
The next highest scoring unassigned pair has a score of 37. Set C has the lowest aggregate score of 78. Because pair 37 has no occlusions with set C, pair 37 is assigned to set C. The sets have the following assignments at this point:
  Set A: {100}, Aggregate Score=100
  Set B: {95, 42}, Aggregate Score=137
  Set C: {78, 37}, Aggregate Score=115
The next highest scoring unassigned pair has a score of 28. Set A has the lowest aggregate score of 100. Because pair 28 has no occlusions with set A, pair 28 is assigned to set A. The sets have the following assignments at this point:
  Set A: {100, 28}, Aggregate Score=128
  Set B: {95, 42}, Aggregate Score=137
  Set C: {78, 37}, Aggregate Score=115
The next highest scoring unassigned pair has a score of 26. Set C has the lowest aggregate score of 115. Because pair 26 has no occlusions with set C, pair 26 is assigned to set C. The sets have the following assignments at this point:
  Set A: {100, 28}, Aggregate Score=128
  Set B: {95, 42}, Aggregate Score=137
  Set C: {78, 37, 26}, Aggregate Score=141
The next highest scoring unassigned pair has a score of 19. Set A has the lowest aggregate score of 128. Because pair 19 has no occlusions with set A, pair 19 is assigned to set A. The sets have the following assignments at this point:
  Set A: {100, 28, 19}, Aggregate Score=147
  Set B: {95, 42}, Aggregate Score=137
  Set C: {78, 37, 26}, Aggregate Score=141
The next highest scoring unassigned pair has a score of 8. Set B has the lowest aggregate score of 137. Because pair 8 has no occlusions with set B, pair 8 is assigned to Set B. The sets have the following final assignments:
  Set A: {100, 28, 19}, Aggregate Score=147
  Set B: {95, 42, 8}, Aggregate Score=145
  Set C: {78, 37, 26}, Aggregate Score=141

At this point, all nine of the sets have been assigned, so after decision box 310, this is the final assignment for this example. Method 300 may be cycled, so that it repeats when a new set of pairs is received in box 301.

FIGS. 2 and 3 have thus described methods of receiving and processing a plurality of AR annotations which are to be displayed display on a user device, and which are paired with indications of real-world objects. The methods 200 and 300 include determining a cognitive demand score for each of the received AR annotations (or pairs of AR data and real object indications), and also assigning each of the AR annotations to one of a set of annotation display groups. When assigning the AR annotations, the methods attempt to balance aggregate cognitive demand scores across the different sets. This results in each display group having an aggregate cognitive demand score (that is the sum of all AR annotation scores within that group) approximately equal to the aggregate cognitive demand score of each of the other display groups. There may be unavoidable differences preventing perfect equality, due to variations in the individual AR annotations. Additionally, attempts to balance aggregate cognitive demand scores may be constrained by minimizing occlusion among the AR annotations assigned to the same annotation display group. In the immediately preceding example, some of the aggregate scores differed by 6 (147 versus 141).

Additionally, the methods (for example, method 200 of FIG. 2), describe receiving another plurality of AR annotations to display on the user device, determining a similarity between the newer received plurality of AR annotations and the earlier received plurality of AR annotations, and if the different sets are not sufficiently similar (determined by comparing a calculated distance with a threshold), generating a new set of annotation display groups and repeating the assignment process.

Figure 4:
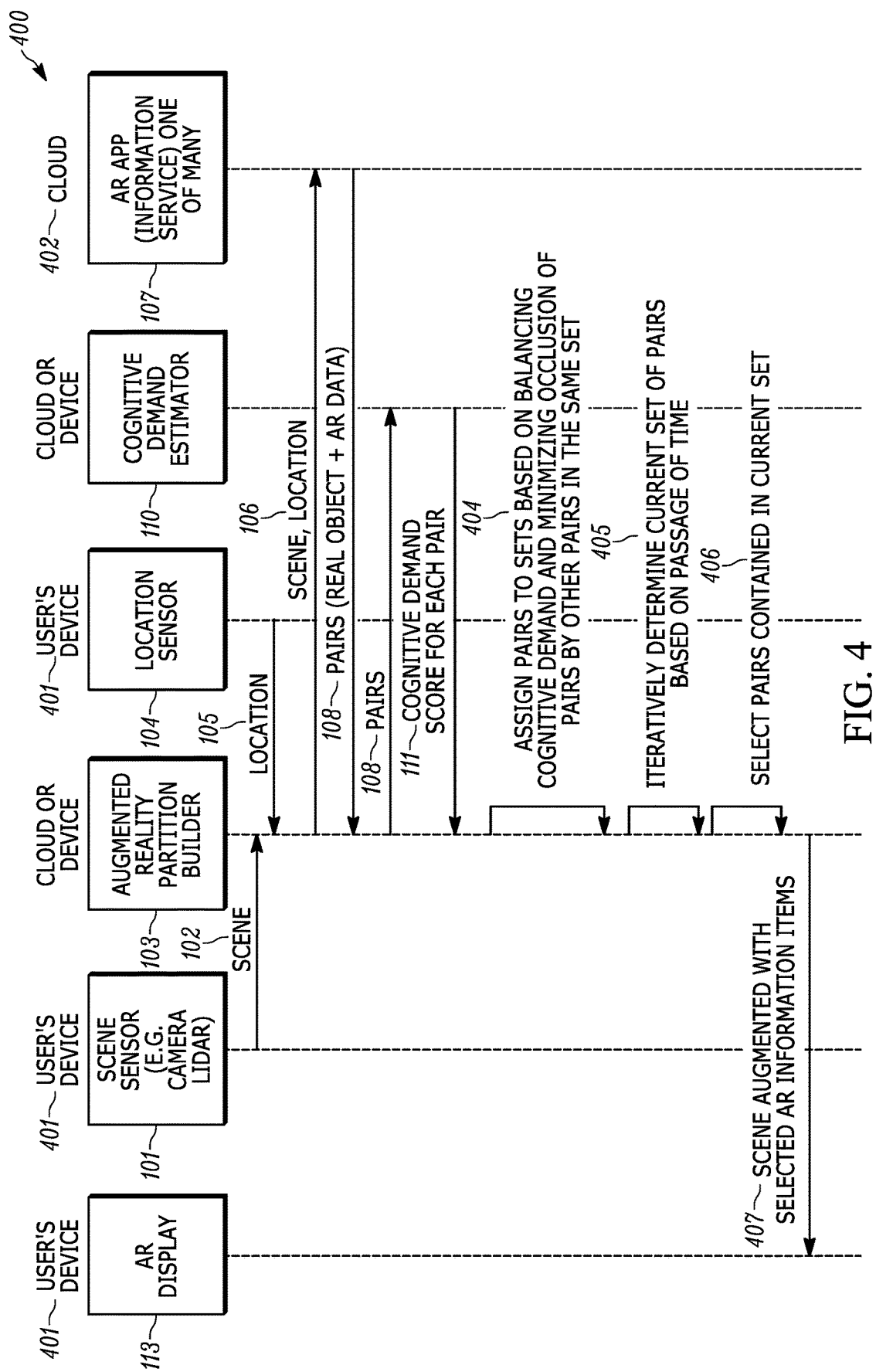
FIG. 4 is an exemplary message sequence diagram for assigning pairs to sets and augmenting a display with AR information.

FIG. 4 is an exemplary message sequence diagram 400 for assigning pairs to sets and augmenting a display with AR information. FIG. 4 will be described using the embodiment illustrated in FIG. 1. A scene sensor 101 (e.g., a camera or LiDAR system) on a user device 401 sends scene information 102 to AR Partition Builder 103. AR Partition Builder 103 also receives location information 105 from a location sensor 104, also on user device 401. The scene and location information 106 may be sent to an AR application 107 or information service on a network or cloud node 402. There may be one or more AR applications 107 receiving such scene and location information 106. AR Partition Builder 103, which may be on user device 401 or a network node 402, receives pairs 108 (Real Object+AR data) from an AR application 107. Pairs 108 are sent to Cognitive Demand Estimator 110, which may be on either user device 401 or a network node 402, and cognitive demand scores 111 are then received by AR Partition Builder 103 for each pair. AR Partition Builder 103 assigns pairs in process 404 to sets so as to balance cognitive demand and minimize occlusion of pairs by other pairs in the same set. Process 404 may take the form of method 200 or 300 or some combination. AR Partition Builder 103 may iteratively determine sets of pairs based on time (e.g., a new set of pairs may be selected every five seconds) in process 405 and may select pairs contained in a current set for display in process 406. AR Partition Builder 103 sends a scene augmented with selected AR information items (perhaps similar to AR information 112) to AR display 113 in process 407 (which may be similar to box 293 of method 200).

As FIG. 4 illustrates, some portions of message sequence diagram 400 correspond to different nodes. For example, user device 401 may receive scene and location data 106, transmit the received scene and location data 106 to remote AR node 402, and receive AR annotations (part of pairs 108) back from remote AR node 402. Some portions of message sequence diagram 400 indicate that different processes may be performed at different nodes. For example, cognitive demand scores 111 may be calculated either locally on user device 401 or at a remote node 402 (either the one that furnished pairs 108 or a different node). While FIG. 4 shows particular acts being performed at certain locations, e.g., the User's Device, Cloud or Device, Cloud, it should be understood that these are examples and these acts may be performed by processing at any of these locations, or combinations thereof.

When the AR annotations are displayed, the display is exclusive to a particular annotation display group. That is, when displaying AR annotations assigned to a first one of the plurality of annotation display groups, AR annotations are not displayed that are assigned to a second one of the first plurality of annotation display groups or any other annotation display group. And also, when displaying AR annotations assigned to the second one of the plurality of annotation display groups, AR annotations are not displayed that are assigned to the first one of the first plurality of annotation display groups or any other annotation display group. The different annotation display groups may be displayed cyclically (i.e., iteratively, one at a time, and repeating until the set of display groups changes).

Figure 5:
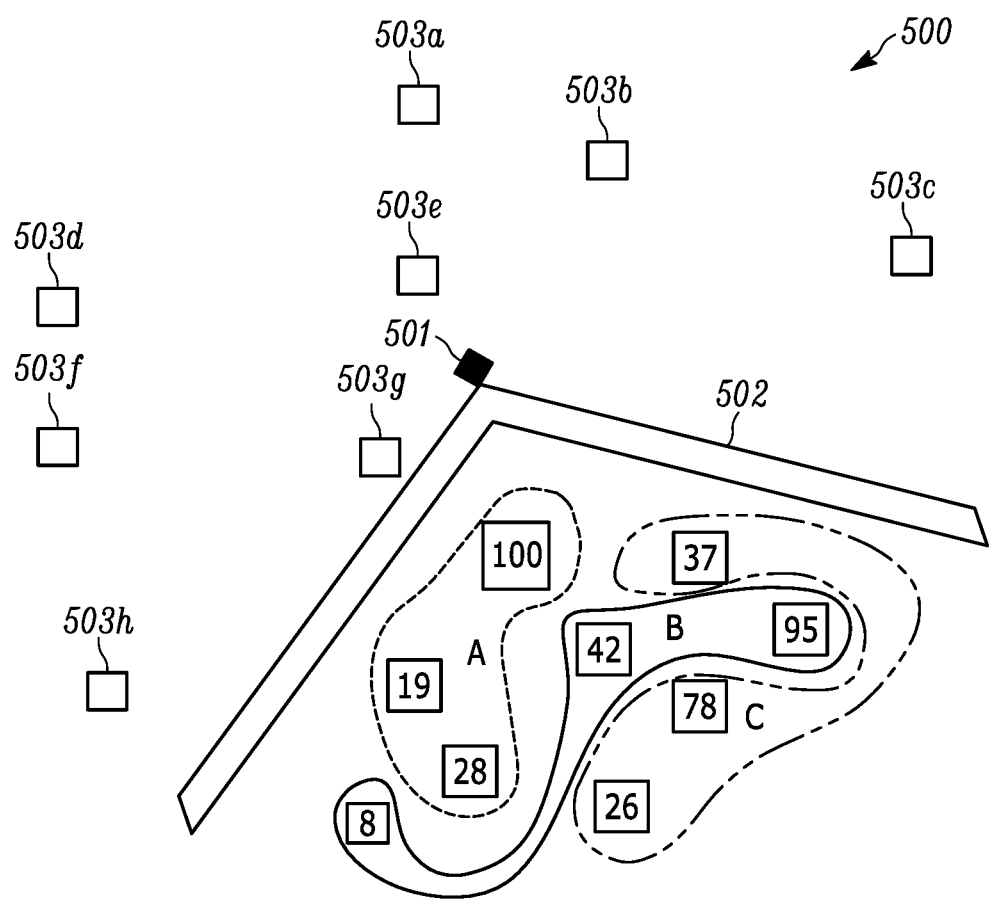
FIG. 5 is a plan-view schematic of an example scene with real-world objects and AR information items.

FIG. 5 is a plan-view schematic 500 of an example scene with real-world objects and AR information items. A user is shown as a solid black diamond 501 in the center of FIG. 5. The chevron 502 indicates the users view angle (the interior angle of the chevron). Received AR information items are shown as squares. Some AR information items 503a-503h are behind the user and are not displayed on the user's device. Some AR applications may use AR information items outside the users field of view to buffer these, in the event the user rapidly pivots and changes the field of view. Such buffering reduces the undesirable effects of network latency, so that whichever ones of the AR information items 503a-503h that become newly visible may be displayed relatively rapidly.

The numbered squares are AR information items that may be used for display and match the exemplary assignment of nine items to sets A, B, and C that was described above. Exemplary screenshots for this arrangement of pairings and sets are shown in FIG. 6.

Figure 6:
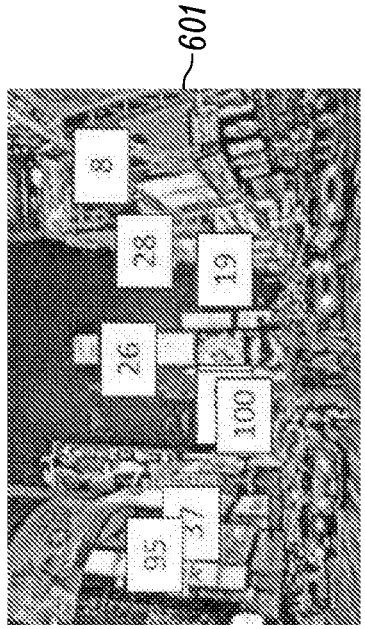
FIG. 6 is a series of screen shots for an example AR display.
Figure 6:
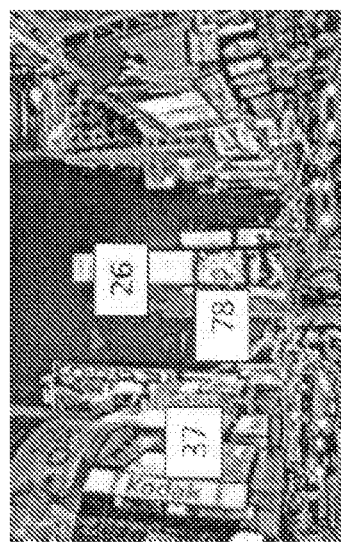
Figure 6:
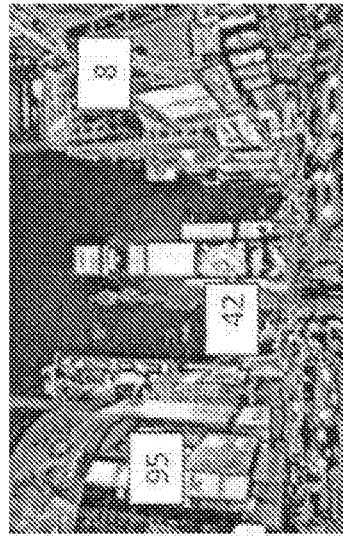
Figure 6:
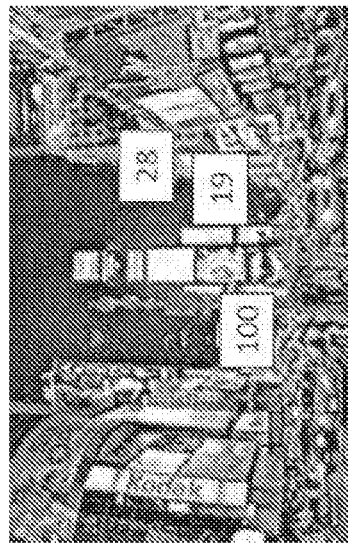

FIG. 6 is a series of screen shots 601 and 602A-602C for an example AR display. Screen shot 601 illustrates what an AR display would show without using systems and methods described herein. Screen shot 602A illustrates what an AR display would show when using systems and methods described herein to create and display set A (see FIG. 5) for a user. The numbers in the rectangles represent augmented information along with a pairs cognitive demand score. Screen shots 602B and 602C illustrate what an AR display would show when creating and displaying sets B and C (see FIG. 5) for a user, respectively.

In some embodiments, a history is stored for sets of pairs and the sets created for those sets of pairs. Such stored information may be used to provide continuity in the user experience, so that sets of pairs displayed may be picked from a rotation that was interrupted earlier.

For example, a user is looking in one direction and sets A, B, and C are created. Set A is displayed first, and then set B. Set B is interrupted, and before set C is displayed, the user looks away. The set of pairs changes, resulting in sets D, E, and F. Set D is displayed, and then the user looks in the same direction as before. Without a history storage, sets of pairs may be calculated afresh and displayed anew. With a history storage, the previously calculated sets may be retrieved for sets A, B, and C. Displaying of the sets may begin with set B because set B was interrupted previously.

In some embodiments, cognitive demand of a pair on a user may use the level of lighting of the real-world object. An object lying in a dark part of a scene may be determined to be more cognitively demanding than an objecting lying in a bright part of the scene.

Network Architecture

Figure 7:
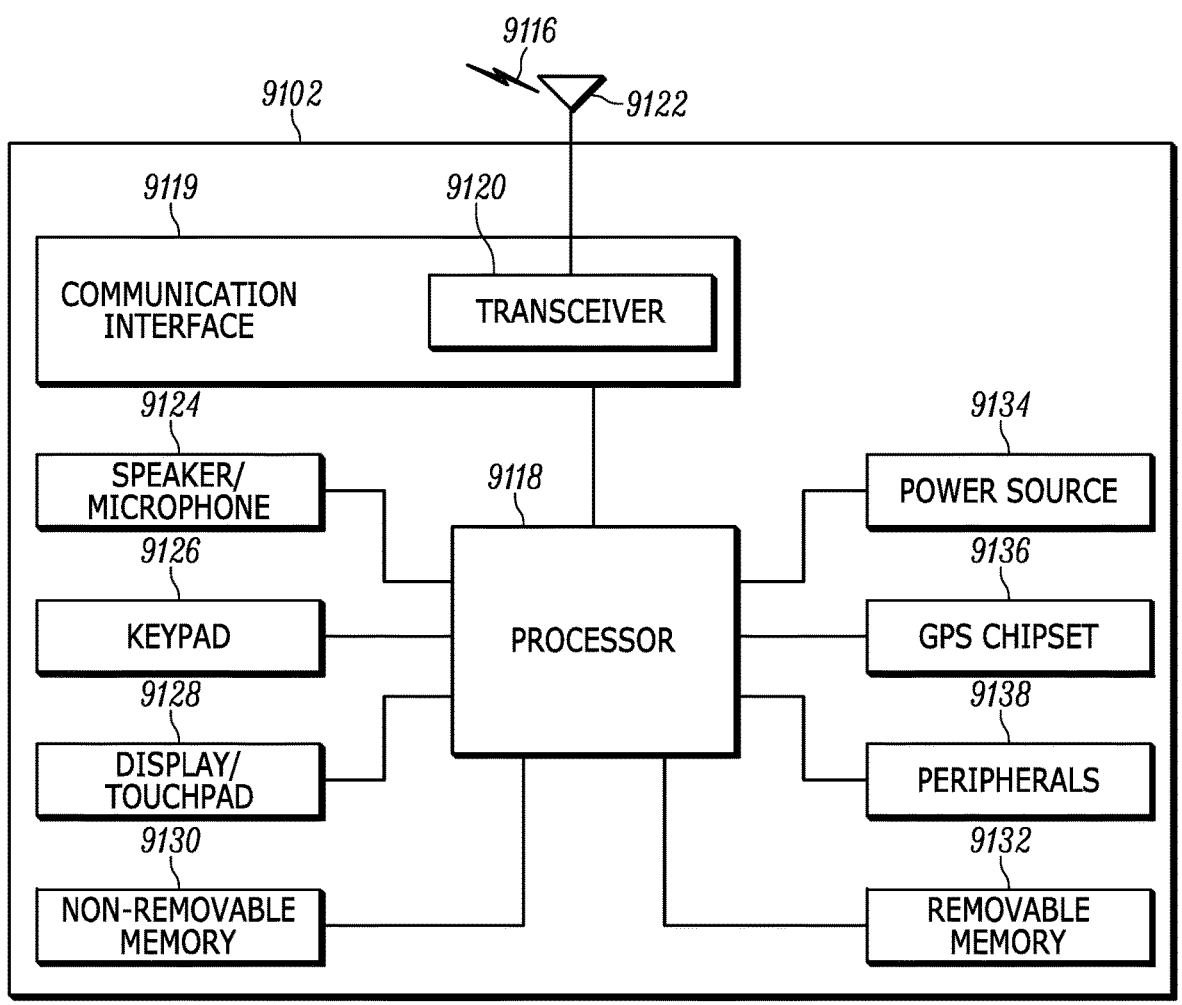
FIG. 7 depicts an example wireless transmit/receive unit (WTRU) that may be used within embodiments of systems described herein.

A wireless transmit/receive unit (WTRU) may be used as an AR display, an AR application, or a user's device in embodiments described herein. FIG. 7 depicts an example WTRU 9102. WTRU 9102 may include a processor 9118, a transceiver 9120, a transmit/receive element 9122, a speaker/microphone 9124, a keypad 9126, a display/touchpad 9128, a non-removable memory 9130, a removable memory 9132, a power source 9134, a global positioning system (GPS) chipset 9136, and other peripherals 9138. The transceiver 9120 may be implemented as a component of decoder logic in communication interface 9119. For example, the transceiver 9120 and decoder logic within communication interface 9119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 9102 may include any sub-combination of the foregoing elements while remaining consistent with an embodiment. Processor 9118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 9118 may perform signal coding, data processing, power control, input/output processing, and/or any other functionality that enables WTRU 9102 to operate in a wireless environment. Processor 9118 may be coupled to transceiver 9120, which may be coupled to transmit/receive element 9122. While FIG. 7 depicts processor 9118 and transceiver 9120 as separate components, processor 9118 and transceiver 9120 may be integrated together in an electronic package or chip.

Transmit/receive element 9122 may be configured to transmit signals to, or receive signals from, a base station over an air interface 9116. For example, in some embodiments, transmit/receive element 9122 may be an antenna configured to transmit and/or receive RF signals. In another embodiment, transmit/receive element 9122 may be an emitter/detector configured to transmit and/or receive IR, UV, or visible light signals, as examples. In yet another embodiment, transmit/receive element 9122 may be configured to transmit and receive both RF and light signals. Transmit/receive element 9122 may be configured to transmit and/or receive any combination of wireless signals.

In addition, although transmit/receive element 9122 is depicted in FIG. 7 as a single element, WTRU 9102 may include any number of transmit/receive elements 9122. More specifically, WTRU 9102 may employ MIMO technology. Thus, in some embodiments, WTRU 9102 may include two or more transmit/receive elements 9122 (e.g., multiple antennas) for transmitting and receiving wireless signals over air interface 9116.

Transceiver 9120 may be configured to modulate the signals that are to be transmitted by transmit/receive element 9122 and to demodulate the signals that are received by transmit/receive element 9122. As noted above, WTRU 9102 may have multi-mode capabilities. Thus, transceiver 9120 may include multiple transceivers for enabling the WTRU 9102 to communicate via multiple RATs, such as UTRA and IEEE 802.11, as examples.

Processor 9118 of WTRU 9102 may be coupled to, and may receive user input data from, speaker/microphone 9124, keypad 9126, and/or display/touchpad 9128 (e.g., a liquid crystal display (LCD) display unit or organic light-emitting diode (OLED) display unit). Processor 9118 may also output user data to speaker/microphone 9124, keypad 9126, and/or display/touchpad 9128. In addition, processor 9118 may access information from, and store data in, any type of suitable memory, such as non-removable memory 9130 and/or removable memory 9132. Non-removable memory 9130 may include random-access memory (RAM), read-only memory (ROM), a hard disk, or any other type of memory storage device. Removable memory 9132 may include a subscriber identity module (SIM) card, a memory stick, a secure digital (SD) memory card, and the like. Non-removable memory 9130 and removable memory 9132 both comprise non-transitory computer-readable media. In other embodiments, processor 9118 may access information from, and store data in, memory that is not physically located on the WTRU 9102, such as on a server or a home computer (not shown).

Processor 9118 may receive power from power source 9134, and may be configured to distribute and/or control the power to the other components in WTRU 9102. Power source 9134 may be any suitable device for powering WTRU 9102. As examples, power source 9134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

Processor 9118 may also be coupled to GPS chipset 9136, which may be configured to provide location information (e.g., longitude and latitude) regarding the current location of WTRU 9102. In addition to, or in lieu of, the information from GPS chipset 9136, WTRU 9102 may receive location information over air interface 9116 from a base station and/or determine its location based on the timing of the signals being received from two or more nearby base stations. WTRU 9102 may acquire location information by way of any suitable location-determination method while remaining consistent with an embodiment.

Processor 9118 may further be coupled to other peripherals 9138, which may include one or more software and/or hardware modules that provide additional features, functionality and/or wired or wireless connectivity. For example, peripherals 9138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8:
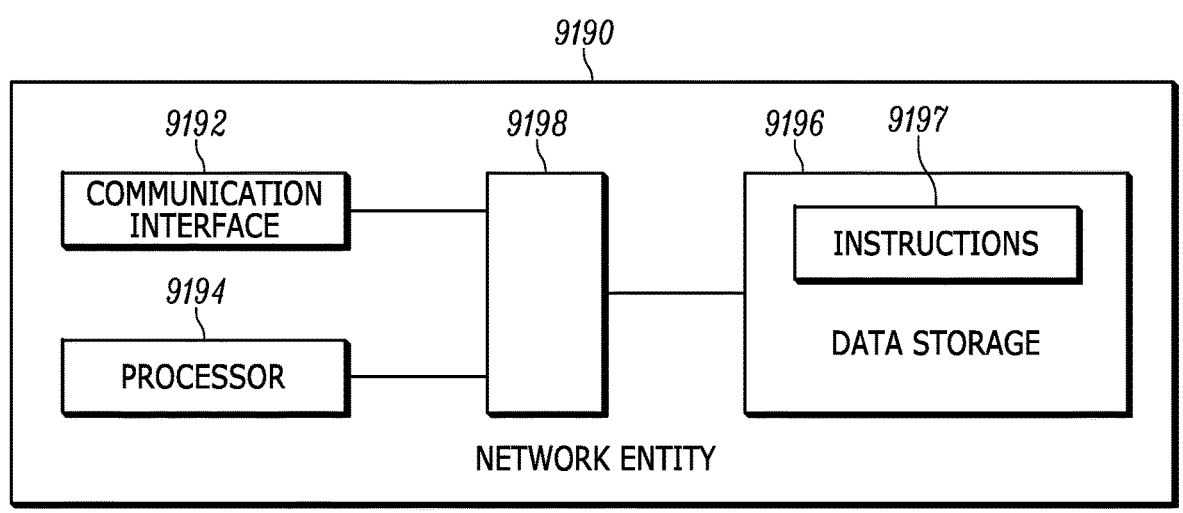
FIG. 8 depicts an exemplary network entity that may be used within embodiments of systems described herein.

FIG. 8 depicts an exemplary network entity 9190 that may be used within embodiments of systems described herein. As depicted in FIG. 8, a network entity 9190 includes a communication interface 9192, a processor 9194, and non-transitory data storage 9196, all of which are communicatively linked by a bus, network, or other communication path 9198.

Communication interface 9192 may include one or more wired communication interfaces and/or one or more wireless-communication interfaces. With respect to wired communication, communication interface 9192 may include one or more interfaces such as Ethernet interfaces, as an example. With respect to wireless communication, communication interface 9192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 9192 may be equipped at a scale and with a configuration appropriate for acting on the network side, rather than the client side, of wireless communications (e.g., LTE communications, Wi-Fi communications, and the like). Thus, communication interface 9192 may include the appropriate equipment and circuitry (including multiple transceivers) for serving multiple mobile stations, UEs, or other access terminals in a coverage area.

Processor 9194 may include one or more processors of any type deemed suitable by those of skill in the relevant art, some examples including a general-purpose microprocessor and a dedicated DSP. Data storage 9196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 8, data storage 9196 contains program instructions 9197 executable by processor 9194 for carrying out various combinations of the various network-entity functions described herein.

In some embodiments, the network-entity functions described herein are carried out by a network entity having a structure similar to that of network entity 9190 of FIG. 8. In some embodiments, one or more of such functions are carried out by a set of multiple network entities in combination, where each network entity has a structure similar to that of network entity 9190 of FIG. 8. In various different embodiments, network entity 9190 is, or at least includes, one or more of an entity in a radio access network (RAN), an entities in a core network, a base station or network node (such as a Node-B, RNC, MGW, MSC, SGSN, GGSN, eNode B, MME), a serving gateway, a PDN gateway, an ASN gateway, an MIP-HA, and an AAA. Other network entities and/or combinations of network entities may be used in various embodiments for carrying out the network-entity functions described herein, as the foregoing set is provided by way of example and not by way of limitation.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (i.e., hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, comprising:
receiving a first plurality of augmented reality (AR) annotations to display on a user device;
determining a cognitive demand score for each of the received AR annotations;
assigning each of the AR annotations to one of a first plurality of annotation display groups, wherein assigning each of the AR annotations to one of a first plurality of annotation display groups comprises balancing aggregate cognitive demand scores across the first plurality of annotation display groups; and
displaying AR annotations assigned to a first one of the first plurality of annotation display groups exclusively of AR annotations assigned to a second one of the first plurality of annotation display groups.

2. The method of claim 1 further comprising:
after displaying AR annotations assigned to the first one of the first plurality of annotation display groups, displaying AR annotations assigned to the second one of the first plurality of annotation display groups exclusively of AR annotations assigned to the first one of the first plurality of annotation display groups.

3. The method of claim 1 further comprising:
cyclically displaying AR annotations assigned to each one of the first plurality of annotation display groups exclusively of AR annotations assigned to different ones of the first plurality of annotation display groups.

4. The method of claim 1 further comprising:
receiving scene and location data; and
transmitting the received scene and location data to an AR node.

5. The method of claim 4 wherein receiving a first plurality of AR annotations comprises receiving the first plurality of AR annotations from the AR node.

6. The method of claim 1 wherein determining the cognitive demand score for each of the first plurality of AR annotations comprises determining the cognitive demand score on the user device.

7. The method of claim 1 wherein balancing aggregate cognitive demand scores across the first plurality of annotation display groups comprises assigning AR annotations to each annotation display group such that sums of cognitive demand scores for each of the first plurality of annotation display groups are approximately equal.

8. The method of claim 1 wherein balancing aggregate cognitive demand scores across the first plurality of annotation display groups comprises assigning an AR annotation to an annotation display group such that the AR annotation neither occludes nor is occluded by any other AR annotation assigned to the same annotation display group.

9. The method of claim 1 wherein assigning each of the AR annotations to one of a first plurality of annotation display groups comprises iteratively:
   selecting an unassigned one of the first plurality of AR annotations having a highest cognitive demand score;
   selecting one of the first plurality of annotation display groups having a lowest aggregate cognitive demand score; and
   assigning the selected unassigned AR annotation to the selected annotation display group.

10. The method of claim 9 wherein selecting one of the first plurality of annotation display groups having the lowest aggregate cognitive demand score comprises selecting one of the first plurality of annotation display groups having the lowest aggregate cognitive demand score that also minimizes occlusion between the selected unassigned AR annotation and other AR annotation assigned to the selected annotation display group.

11. The method of claim 1 wherein determining the cognitive demand score for each of the AR annotations comprises summing a size value and a complexity value for each of the AR annotations.

12. The method of claim 11 further comprising:
   determining the size value for each of the AR annotations by determining an angle subtended from a viewing point to farthest opposing points on a boundary of a real-world object that is paired with the AR annotation.

13. The method of claim 11 further comprising:
   determining the complexity value for each of the AR annotations by determining a compressed size of an image of a real-world object that is paired with the AR annotation.

14. The method of claim 1 further comprising:
   receiving a second plurality of AR annotations to display on a user device;
   responsive to receiving the second plurality of AR annotations, determining a similarity between the second plurality of AR annotations and the first plurality of AR annotations; and
   responsive to the similarity being below a threshold, generating a new plurality of annotation display groups and assigning each one of the second plurality of AR annotations to one of the new plurality of annotation display groups.

15. A method of displaying augmented reality (AR) information, the method comprising:
   receiving a first plurality of AR information items within a users view;
   allocating the first plurality of AR information items into a first plurality of display sets;
   cyclically displaying the first plurality of display sets, wherein different ones of the first plurality of display sets are displayed exclusively.

16. The method of claim 15, wherein allocating the first plurality of AR information items into a first plurality of display sets comprises balancing aggregate cognitive demand scores across the display sets of the first plurality of display sets.

17. The method of claim 5, wherein allocating the first plurality of AR information items into a first plurality of display sets comprises assigning an AR information item to a display set such that the AR information item neither occludes nor is occluded by any other AR information item assigned to the same display set.

18. The method of claim 15, wherein allocating the first plurality of AR information items into a first plurality of display sets comprises iteratively:
   selecting an unallocated one of the first plurality of AR information items having a highest cognitive demand score;
   selecting one of the first plurality of display sets having a lowest aggregate cognitive demand score; and
   allocating the selected unallocated AR information item to the selected display set.

19. A device comprising a processor and a non-transitory computer-readable medium storing instructions that are operative, when executed by the processor, to perform functions comprising:
   receiving a first plurality of augmented reality (AR) annotations to display on a user device;
   determining a cognitive demand score for each of the received AR annotations;
   assigning each of the AR annotations to one of a first plurality of annotation display groups, wherein assigning each of the AR annotations to one of a first plurality of annotation display groups comprises balancing aggregate cognitive demand scores across the first plurality of annotation display groups; and
   displaying AR annotations assigned to a first one of the first plurality of annotation display groups exclusively of AR annotations assigned to a second one of the first plurality of annotation display groups.

20. The device of claim 19, wherein the instructions are further operative, when executed by the processor, to cause the device to cyclically display AR annotations assigned to each one of the first plurality of annotation display groups exclusively of AR annotations assigned to different ones of the first plurality of annotation display groups.

21. The device of claim 19, wherein determining the respective cognitive demand score for each of the first plurality of AR annotations comprises determining the cognitive demand score on the user device.

22. The device of claim 19, wherein determining the respective cognitive demand score for each of the AR annotations comprises summing a size value and a complexity value for each of the AR annotations.

* * * * *

UNITED STATES PATENT AND TRADEMARK OFFICE
CERTIFICATE OF CORRECTION

PATENT NO. : 10,867,181 B2
APPLICATION NO. : 16/480068
DATED : December 15, 2020
INVENTOR(S) : Mona Singh It is certified that error appears in the above-identified patent and that said Letters Patent is hereby corrected as shown below:

In the Claims

Claim 15, Column 15, Line 56: Replace "a users view;" with --a user's view;--

Claim 17, Column 16, Line 9: Replace "The method of claim 5" with --The method of claim 15--

Signed and Sealed this
Twenty-seventh Day of December, 2022

Katherine Kelly Vidal
*Director of the United States Patent and Trademark Office*